(12) United States Patent
Chao

(10) Patent No.: US 6,682,707 B2
(45) Date of Patent: Jan. 27, 2004

(54) AUTOMOBILE AIR FILTER

(75) Inventor: Lance Chao, Taipei (TW)

(73) Assignee: Kiwi Auto Accessories Co., Ltd., Taipei Hsien (TW)

( * ) Notice: Subject to any disclaimer, the term of this patent is extended or adjusted under 35 U.S.C. 154(b) by 260 days.

(21) Appl. No.: 09/987,220

(22) Filed: Nov. 14, 2001

(65) Prior Publication Data

US 2003/0091483 A1 May 15, 2003

(51) Int. Cl.[7] ................................................ B01J 19/08
(52) U.S. Cl. ......................... 422/186.07; 422/186.04; 422/121
(58) Field of Search ..................... 422/186.07, 121, 422/186.04

(56) References Cited

U.S. PATENT DOCUMENTS 6,212,883 B1 * 4/2001 Kang ............................ 60/275
6,517,786 B1 * 2/2003 Best et al. ................. 422/186.04

* cited by examiner

Primary Examiner—Kishor Mayekar
(74) Attorney, Agent, or Firm—Rosenberg, Klein & Lee

(57) ABSTRACT

An automobile air filter comprising a filter element, an outer hood receiving the filter element, and a plurality of metal electrodes arranged in the filter element. Each pair of the metal electrodes is connected by a cable and pass through the outer hood. A high voltage generator circuit is installed at appropriate location of an automobile for generating instantaneous high voltage to provide instantaneous high voltage power to each pair of metal electrodes, so that the metal electrodes generate high voltage flashes and ozone to purify the air flowing in the filter element and increase oxygen content in the air intake in the engine.

7 Claims, 4 Drawing Sheets

AUTOMOBILE AIR FILTER

BACKGROUND OF THE INVENTION

1. Field of the Invention

The invention relates to an automobile air filter, particularly to an air filter installed in the automobile, including an ozone generator installed in the filter.

2. Description of the Prior Art

Air filters are installed in automobiles for the purpose of filtering air intake in an engine. The conventional automobile air filter has only filter element to filter air, but it does not have much contribution to filtering air intake in the engine. In an air polluted environment, due to the deteriorated air quality or insufficient oxygen content in the air intake, the filter element could not improve the air quality in the engine or increase its oxygen content, resulting in poor air quality inside the engine, reduced explosive power of engine, failure of complete fuel combustion, and poor engine performance and operation of the automobile.

SUMMARY OF THE INVENTION

The primary objective of the invention is to provide an automobile air filter with a secondary air purifying function in addition to the filter element, to improve air intake quality and explosive power of the engine.

The further objective of the invention is to provide an automobile air filter, which is capable of producing ozone inside the filter element in order to increase the oxygen content in the air intake in the engine and enable complete fuel combustion.

To achieve the above purposes, the present invention of automobile air filter comprises a filter element, the filter element is received in an outer hood. At an appropriate location at the bottom of the filter element, a plurality of metal electrodes is arranged in pairs. Each pair of metal electrodes is connected to a cable and pass through the outer hood. A high voltage generator circuit is installed at appropriate location of the car to produce instantaneous high voltage. The high voltage generator circuit is connected to the cable to provide instantaneous high voltage power to each pair of metal electrodes. Therefore, each pair of metal electrodes produces high voltage flashes and ozone (03) simultaneously to purify air inside the filter element, and further increase oxygen content in the air intake in the engine to provide high explosive power and complete fuel combustion.

For better understanding of the technology, technical approach, and anticipated performance and objectives of the present invention, please refer to the detailed description and drawings as follows.

DETAILED DESCRIPTION OF PREFERRED EMBODIMENTS

Figure 1:
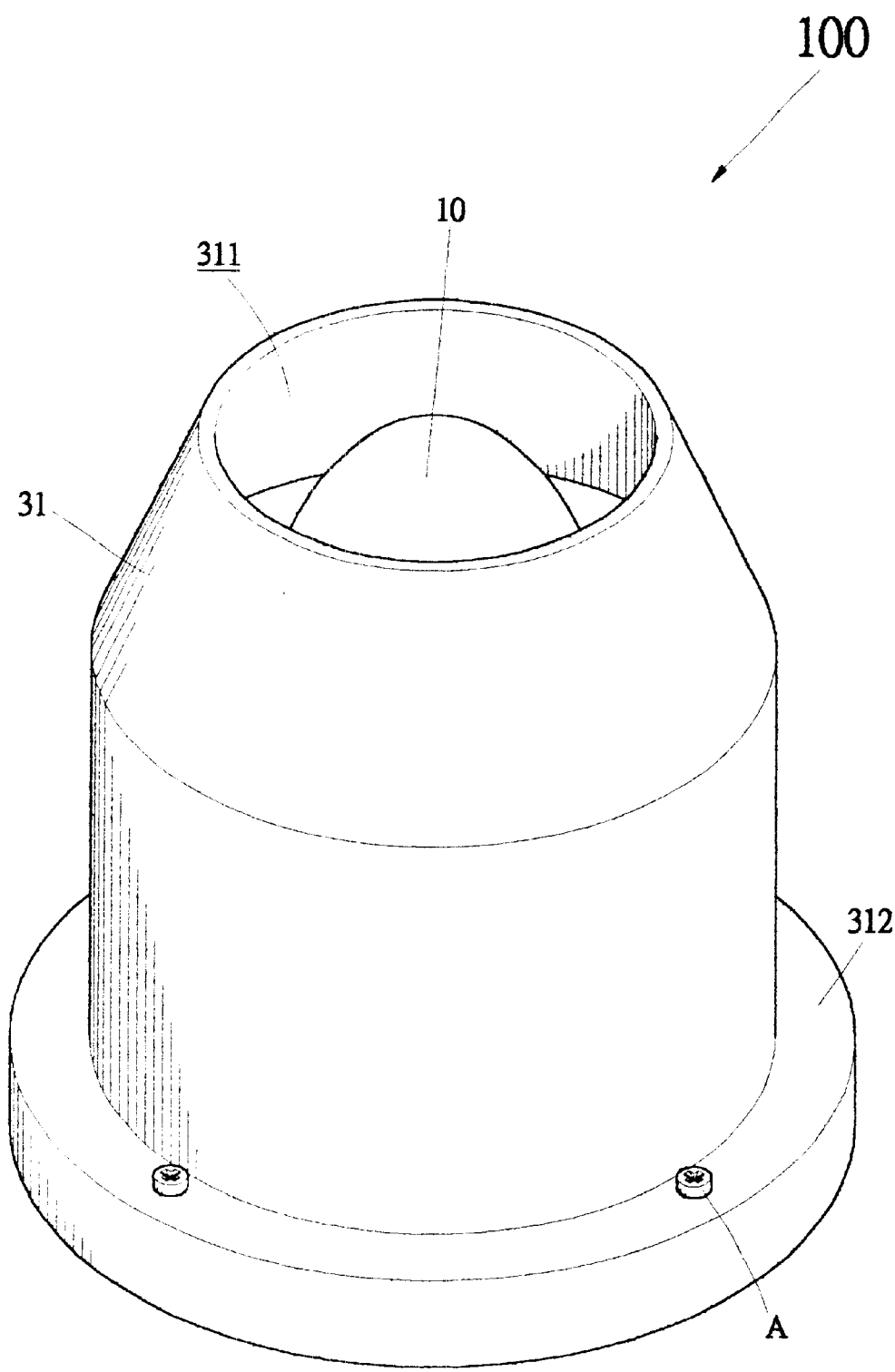
FIG. 1 is a perspective view of the automobile air filter of the invention.
Figure 2:
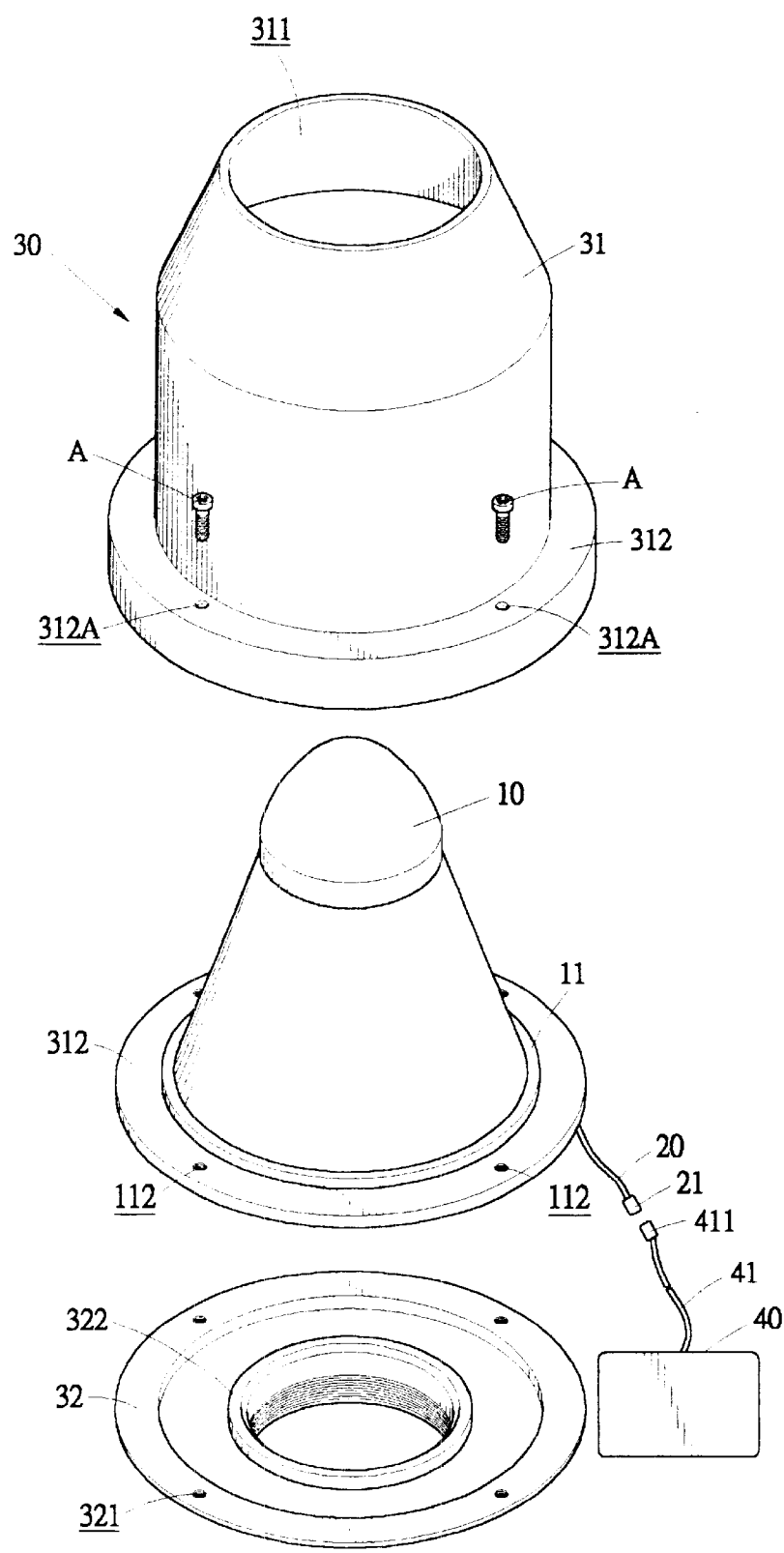
FIG. 2 is an exploded view of the automobile air filter of the invention.
Figure 3:
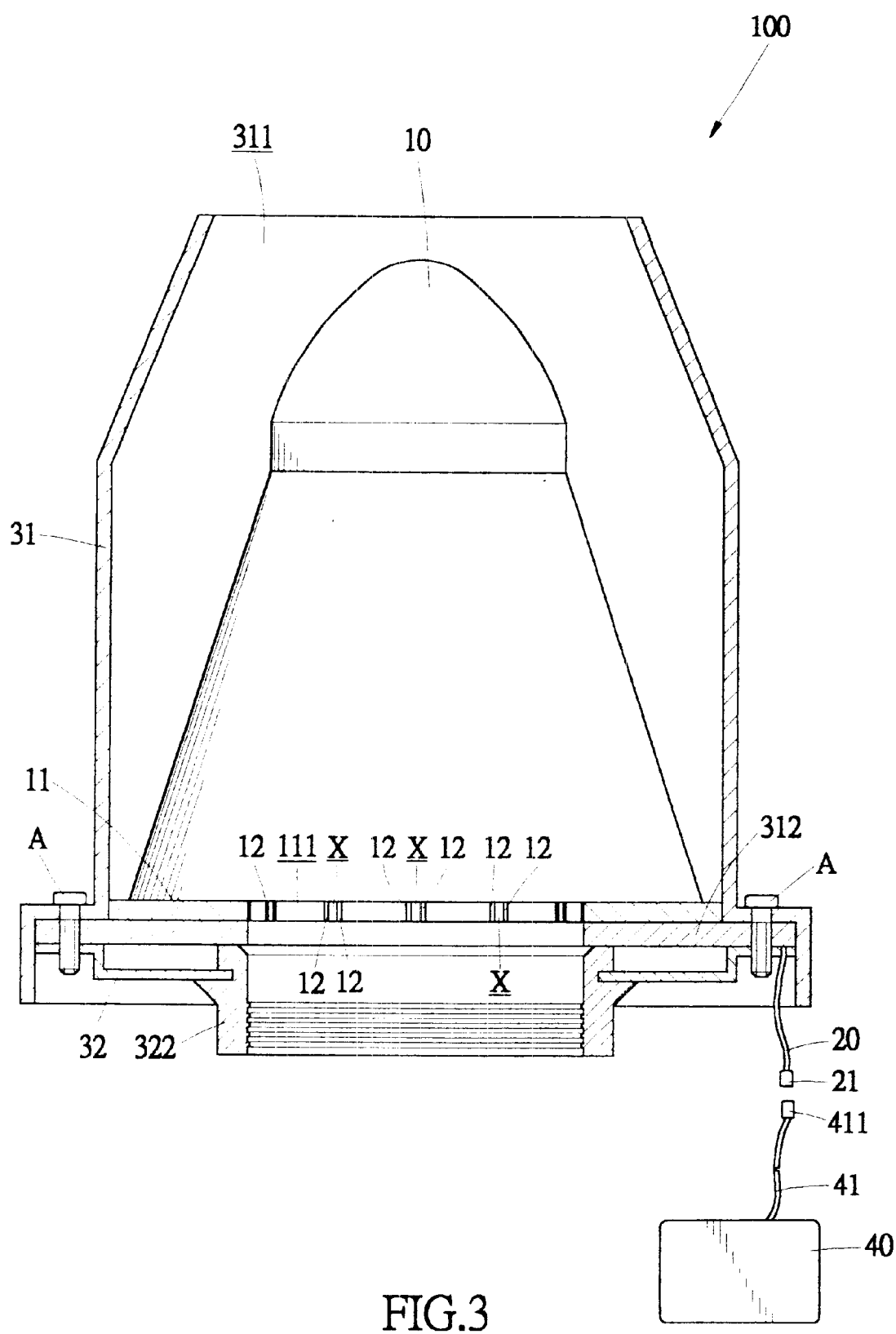
FIG. 3 is a section view of the automobile air filter of the invention.

As shown in FIGS. 1, 2 and 3, the automobile air filter 100 of the invention comprises a filter element 10 and an outer hood 30. The outer hood 30 is formed by a main unit 31 and a base 32. A base 11 is formed at the bottom of the filter element 10. In the base 11, there is an outlet 111 that serves as an output duct for air passing the filter element 10. A plurality of through holes 112 is formed on the rim of the base 11. A plurality of paired metal electrodes 12 are arranged at appropriate location on the inside wall of the outlet 111, with a narrow discharge clearance X between each pair of metal electrodes 12. All metal electrodes 12 are connected in a circuit by a main cable 20. A connector 21 is connected at one end of the main cable 20.

As shown in FIG. 2, the main unit 31 has an air inlet 311 for receiving the filter element 10 and air intake. A bottom flange 312 is formed at the bottom of the main unit 31. There are a plurality of holes 312A formed on the bottom flange 312 to match the through holes 112 on the filter element 10. There are also a plurality of screw holes 321 formed on the rim of the base 32 to match the holes 312A and the through holes 112. Using a bolt A to tighten the main unit 31, the filter element 10 and the base 32. The filter element 10 is fastened between the main unit 31 and the base 32. A pipe connector 322 is formed at the center of the base 32. The pipe connector 322 has an upper end that is tightly joined to an outlet 111 on the bottom of the filter element 10, and a lower end that is joined to an engine air intake pipe B (shown in FIG. 4) in order to feed the air coming out of the outlet 111 of the filter element 10 through the engine air intake pipe B into engine C. A cable 20 which connects all metal electrodes 12 in the filter element 10 passes through the clearance between the main unit 31 and the base 32. The base 32 can alternatively provide a cable hole for the cable 20 passing through.

A high voltage generator 40 is used to generate output instantaneous high voltage. The high voltage generator 40 is installed inside the automobile. The high voltage generator 40 has an output cable 41 to produce instantaneous high voltage power. A connector 411 is connected at one end of the output cable 41 to match and join with the connector 21 of the cable 20. The high voltage generator 40 provides instantaneous high voltage power to all pairs of metal electrodes 12, so that each pair of metal electrodes 12 can produce instantaneous high voltage flashes in the discharge clearance and produce ozone ($O_3$).

Figure 4:
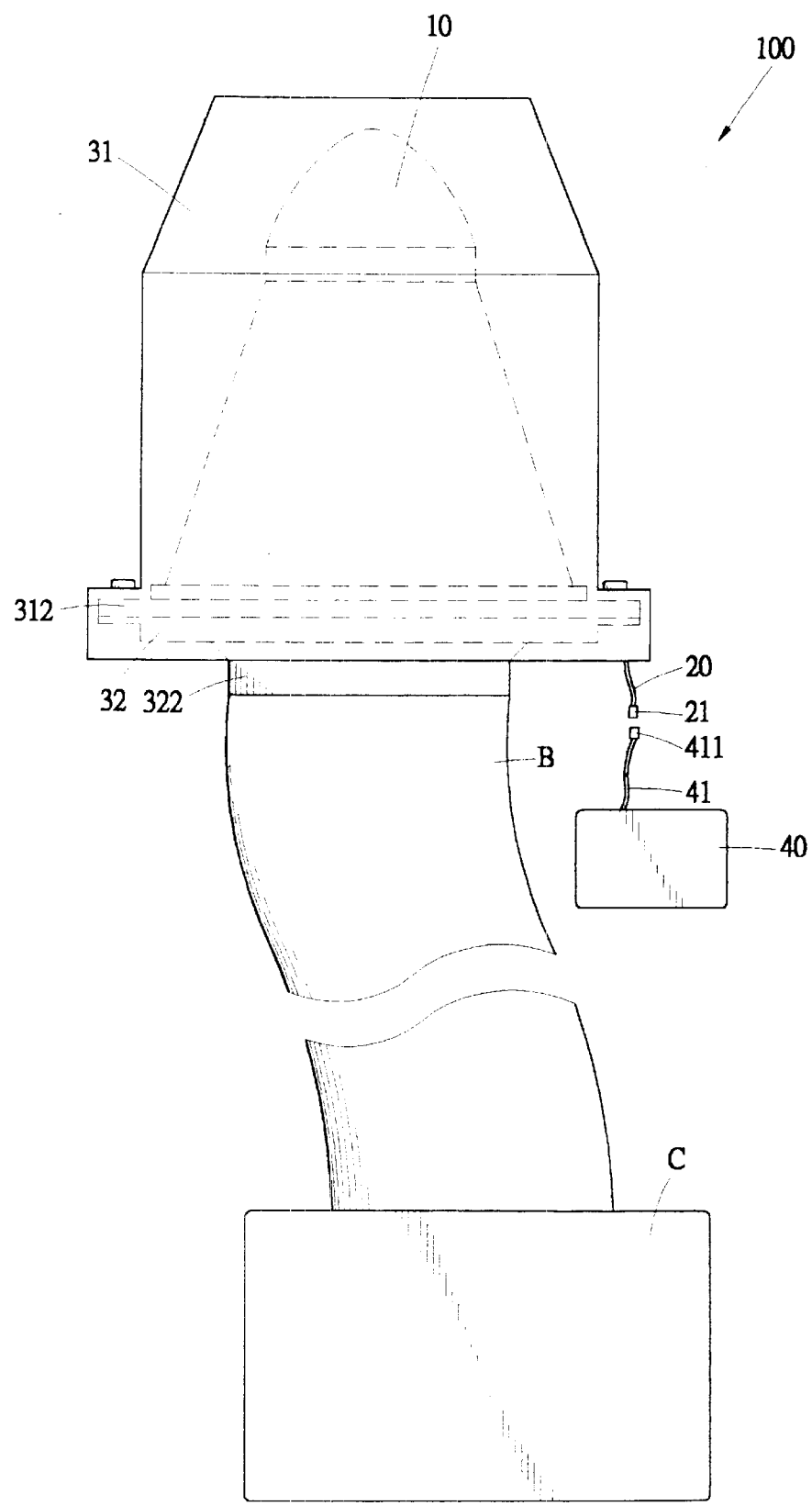
FIG. 4 is a preferred application of the automobile air filter of the invention.

Please refer to FIG. 4 showing a preferred application of automobile air filter 100 of the invention. Each pair of metal electrodes 12 in the filter element 10 produces high voltage flashes and ozone ($O_3$) to distribute instantaneous high voltage power sources respectively. Air subjected to preliminary filtering process in the filter element 10 is then subjected to secondary purifying process by the ozone. Meanwhile, the ozone increases the oxygen content in air intake, enabling the air passing through the engine air intake pipe B into the engine C to have higher explosive power and better efficiency of complete combustion, which in turn will enhance the performance of the engine. Meanwhile, to replace a new unit of the entire filter element 10, the user need only disassemble the main unit 31 and the base 32 of the outer hood 30 to gain access. By such convenient and speedy operation, the simplified and efficient ozone generating mechanism is capable of achieving the purpose of enhanced performance of the engine C.

What is claimed is:

1. An automobile air filter comprising a filter element, a plurality of metal electrodes and an outer hood, the filter element being received in the outer hood, a pipe connector being connected at a lower end of the outer hood to join with an engine air intake pipe of an engine, characterized in that:

the plurality of metal electrodes are arranged in pairs and formed inside the filter element; a plurality of discharge clearances are formed between each pair of metal electrodes; all metal electrodes are connected by a cable; the cable is passed through the outer hood and connected with a high voltage power source to supply instantaneous high voltage to each pair of metal electrodes, thereby, high instantaneous voltage flashes are generated in the clearance between each pair of metal electrodes to produce ozone ($O_3$) that enters with air intake through the engine air intake pipe into the engine.

2. The automobile air filter as claimed in claim 1, further comprising a base is formed at a bottom of the filter element; the base having an outlet for installing the metal electrodes.

3. The automobile air filter as claimed in claim 1, wherein the outer hood has a main unit and a hood base; the filter element is joined between the main unit and the hood base, the pipe connector is joined onto the hood base.

4. The automobile air filter as claimed in claim 3, wherein the main unit has an air inlet to accommodate the filter element and air intake.

5. The automobile air filter as claimed in claim 3, wherein a plurality of through holes are formed in the base of the filter element; the main unit has a bottom flange at the bottom thereof; a plurality of holes are formed on the bottom flange; and a plurality of screw holes are formed on the base to match the through holes and the holes respectively for tightening by bolts.

6. The automobile air filter as claimed in claim 1, wherein the cable of the filter element is connected to an outer high voltage generator adapted to as a high voltage power source and to provide instantaneous high voltage power to each pair of the metal electrodes.

7. The automobile air filter as claimed in claim 6, wherein a connector is connected to the end of the cable; and the high voltage generator has an output cable, a connector is formed at an end of the output cable to connect to the connector of the cable.

* * * * *